United States Patent Office 2,764,584
Patented Sept. 25, 1956

2,764,584
3,6-DIOXY-PYRIDAZINES

Jean Druey, Riehen, Switzerland, assignor to Ciba Pharmaceutical Products, Inc., Summit, N. Y.

No Drawing. Application February 25, 1954, Serial No. 412,629

Claims priority, application Switzerland March 2, 1953

8 Claims. (Cl. 260—250)

This invention relates to new diethers of 3,6-dihydroxy-pyridazines, namely, 3-(OR')-6-(OR")-4-($R_1$)-5-($R_2$)-pyridazines, which can be represented by the formula

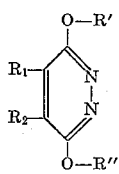

in which R' and R" represent aliphatic, aromatic or araliphatic residues, preferably lower alkoxy, arkyl or alkenyl groups or phenyl or benzyl groups, and especially lower alkyl groups, and $R_1$ and $R_2$ represent hydrogen or lower alkyl residues.

The above compounds possess interesting pharmacological properties. Thus, they have a restraining action on the central nervous system and are useful as sedatives. Especially valuable are 3,6-di-lower alkoxy-pyridazines and particularly, 3,6-di-isopropoxy-pyridazine, 3,6-dimethoxy-pyridazine, and 3,6-di-n-butoxy-pyridazine, and 3,6-diphenoxy-pyridazine.

The pew pyridazines can be prepared by reacting a pyridazine of the formula

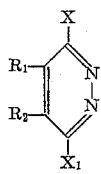

in which X and $X_1$ represent halogen atoms, e. g. chlorine or bromide, and $R_1$ and $R_2$ represent hydrogen or lower alkyl residues, with an aliphatic or araliphatic alcohol or an aromatic phenol in such manner that the two halogen atoms enter into reaction in one operation or in stages. The alcohols or phenols are advantageously used in the form of their alcoholates or phenolates, especially those with alkali metals. Instead of the alcoholates or phenolates, there may be used the alcohols or phenols in the presence of condensing agents capable of converting the alcohols into the alcoholates or the phenols into the phenolates. Both of the halogen atoms in the 3,6-dihalogen-pyridazines may be exchanged in one operation for example with an alkali alcoholate or phenolate advantageously at a temperature of at least 100° C. When only one halogen atom is to be reacted in a first stage, it is of advantage to maintain the temperature below 100° C., if necessary, by external cooling. In order to react the second halogen atom in a second stage with an alcoholate or phenolate, the temperature is raised above 100° C. As a solvent there is advantageously used the alcohol of the alcoholate. It may, however, be of advantage to react the alcoholate or phenolate in suspension in an inert solvent, for example, benzene or toluene.

The starting materials are known or can be produced by per se conventional methods. It is of advantage to use such starting materials as will produce the diethers of 3,6-dihydroxy-pyridazines above designated as especially valuable.

The present invention also relates to any modification in which intermediate products obtainable at any stage of the process are employed as starting materials and the remaining stages of the process are carried out. It also embraces pharmaceutical preparations, that is to say, mixtures of substances containing the new substances, especially 3,6-dimethoxy-pyridazine in admixture with a non-toxic, pharmaceutically suitable vehicle. The vehicle consists for example of one or more of such non-toxic substances as do not react with the new compounds, as for example, gelatine, lactose, starch, magnesium stearate, talcum, water, vegetable oils, benzyl alcohols, gums, polyalkylene glycols or other substances known as pharmaceutical carriers. The pharmaceutical products may take the form of tablets, pills, capsules and the like or may be liquids which contain the new substances in solution, suspension or emulsions; they can be made by the usual methods. The preferred mixtures of substances are those in which the new compounds are present in a concentration of 1–80 per cent by weight, especially 1–60 per cent. Of special therapeutic value are the tableted mixtures suitable for oral application, especially those which have a diether content of 10–60 per cent. The pharmaceutical preparations are intended for use in human and veterinary medicine.

The following examples illustrate the invention, the parts being by weight unless otherwise stated, and the relationship of parts by weight to parts by volume being the same as that of the gram to the cubic centimeter:

Example 1

14.9 parts of 3,6-dichloro-pyridazine are cautiously introduced into a sodium methylate solution of 4.6 parts of sodium in 100 parts by volume of methyl alcohol, and then the mixture is heated for 6 hours at 120–130° C. After cooling the sodium chloride formed is removed, the methyl alcohol is eliminated under reduced pressure, and the residue is recrystallized from 50 parts by volume of water. There are obtained 12 parts of 3,6-dimethoxy-pyridazine which melts at 108° C.

The same product is obtained by reacting 3,6-dichloro-pyridazine with sodium methylate in boiling anhydrous toluene.

The 3,6-dichloro-pyridazine used as starting material is obtained from cyclic maleic acid hydrazide by heating the latter with phosphorus oxychloride. After recrystallization from hexane it melts at 70° C.

The 3,6-dimethoxy-pyridazine can be made into a tablet for oral application having the composition:

| | Mg. |
|---|---|
| 3,6-dimethoxy-pyridazine | 250 |
| Lactose | 100 |
| Wheat starch | 85 |
| Gelatine | 4 |
| Magnesium stearate | 2 |
| Maranta starch | 45 |
| Talcum | 14 |
| | 500 |

Example 2

2.3 parts of sodium are dissolved in 50 parts by volume of absolute ethyl alcohol. 7.45 parts of 3,6-dichloro-pyridazine are slowly introduced, and then the reaction mixture is heated for 6 hours at 120–130° C. After cooling the mixture it is evaporated to dryness under reduced pressure. The residue, after being treated with water and recrystallized from 12 parts by volume of low boiling petroleum ether, yields 7 parts of 3,6-diethoxy-pyridazine melting at 50° C.

Example 3

From 7.5 parts of 3,6-dichloro-pyridazine, 2.3 parts of sodium and 100 parts by volume of isopropyl alcohol there are obtained in a manner analogous to that described in Example 1 or 2, 8 parts of 3,6-di-isopropoxy-pyridazine in the form of a colorless pleasant smelling oil boiling at 122–124° C. under 13 mm. pressure.

Example 4

4.8 parts of citraconic anhydride are dissolved in 40 parts by volume of absolute ethyl alcohol and mixed dropwise with 2 parts by volume of hydrazine hydrate. The reaction mixture is then allowed to stand for a few hours at normal temperature. The precipitated product is separated and dissolved in boiling water, and upon cooling the cyclic citraconic acid hydrazide separates out in colorless crystals. It melts at about 275° C. with strong decomposition.

2 parts of cyclic citraconic acid hydrazide are heated at 100° C. for one hour with 10 parts of phosphorus oxychloride. The excess of phosphorus oxychloride is removed under reduced pressure and the residue is taken up in ice-water. 3,6-dichloro-4-methyl-pyridazine separates out in crystalline form. When recrystallized from cyclohexane it melts at 85–86° C.

16.3 parts of 3,6-dichloro-4-methyl-pyridazine are reacted with 4.6 parts of sodium in 50 parts by volume of methanol exactly as described in Example 1. The resulting 3,6-dimethoxy-4-methyl-pyridazine melts at 80–81° C. after recrystallization from water.

Example 5

2.3 parts of sodium are dissolved in 100 parts of phenol on the water bath and 7.5 parts of 3,6-dichloro-pyridazine are added. The mixture is heated for 6 hours at 150–160° C. and, after being cooled, is taken up in 300 parts by volume of a 2 N-solution of caustic soda. A small amount of ether is added, and the undissolved product is separated by filtering with suction. By recrystallization from ethyl alcohol there is obtained pure 3,6-diphenoxy-pyridazine melting at 140° C.

Example 6

3 parts of 3-chloro-6-methoxy-pyridazine (obtained from 3,6-dichloro-pyridazine in methanol in the presence of one equivalent sodium) are introduced into a solution, having a temperature of 100° C. of 0.6 part of sodium in 30 parts of phenol. The reaction mixture is then heated at 130° C. for 4 hours. The mixture is then poured, without cooling, into 300 parts by volume of caustic soda solution of 10 per cent strength, and the precipitated reaction product is extracted with ether. The ethereal residue can be recrystallized from cyclohexane. In this manner there are obtained 3.5 parts of 3-phenoxy-6-methoxy-pyridazine melting at 100–101° C.

Example 7

7.5 parts of 3,6-dichloro-pyridazine are introduced into a solution of 2.3 parts of sodium in 100 parts by volume of butanol. When the exothermic reaction has subsided the mixture is heated for 6 hours in a pressure vessel at 150° C. After cooling, the excess of butanol is distilled off in vacuo. The oily residue which remains behind is treated with water and ether. The ethereal portion yields on evaporation 9 parts of 3,6-di-n-butoxy-pyridazine. The new product boils at 165° C. under 11 mm. pressure of mercury.

Example 8

The diethers of 3,6-dihydroxy-pyridazine named below are obtained from 3,6-dichloro-pyridazine in a manner similar to those described in Examples 1–4 by using the corresponding alcohols in the presence of 2 equivalents of sodium at a temperature of at least 100° C.

3,6-di-n-propoxy-pyridazine melting at 43° C.
3,6-di-allyloxy-pyridazine melting at 48° C.
3,6-di-benxyloxy-pyridazine melting at 134° C.

Example 9

30 parts of sodium are dissolved in 400 parts by volume of absolute ethylene glycol mono ethyl ether while passing nitrogen through. 97 parts of 3,6-dichloro-pyridazine in 250 parts by volume of ethylene glycol mono ethyl ether are entered into the solution and the reaction mixture is then heated for 6 hours to 135–145° C. while being agitated. After cooling, the whole is evaporated to dryness in vacuo. Water is added to the residue and the whole extracted with ether. The ethereal solution is dried and evaporated. There remains as a pale yellow crystallizate the 3,6-di-(3'-oxa-pentoxy)-pyridazine of the formula

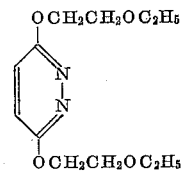

melting at 71–73° C. (yield 92%).

Example 10

30 parts of sodium are dissolved in 400 parts by volume of absolute ethylene glycol mono methyl ether while passing nitrogen through. Into this solution 97 parts of 3,6-dichloro-pyridazine in 250 parts by volume of ethylene glycol mono methyl ether are entered and the whole is reacted and worked up in an analogous manner to that described in Example 9. There are thus obtained 129 parts of 3,6-di-(3'-oxa-butoxy)-pyridazine of the formula

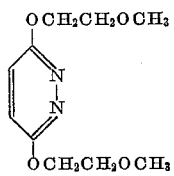

melting at 55.5–56.5° C.

Example 11

15.5 parts of sodium are dissolved in 250 parts by volume of absolute methyl Carbitol (diethylene glycol mono methyl ether). 50 parts of 3,6-dichloro-pyridazine in 125 parts by volume of methyl-Carbitol are added to this solution and the whole is heated for 8 hours to 135–145° C. Working up is carried out as described in Example 9. The residue is recrystallized from isopropylether. The resulting 3,6-di-(3',6'-dioxa-heptoxy)-pyridazine melts at 44–45° C.

Example 12

8.3 parts of 3,6-dichloro-4-methyl-pyridazine are introduced into a solution of 2.7 parts of sodium in 80 parts by volume of isopropyl alcohol. The mixture is heated to 120–130° C. for 6 hours. After cooling, it is evaporated to dryness under reduced pressure and the residue mixed with water and extracted with ether. The ethereal solution is dried and evaporated. On distillation of the ether residue, 8.1 parts of 3,6-diisopropoxy-4-methyl-pyridazine are obtained. The product melts at 125–128° C.

What is claimed is:

1. 3 - (OR') - 6 - (OR") - 4 - (R₁) - 5 - (R₂) - pyridazines, wherein R₁ and R₂ represent hydrogen atoms and R' and R" stand for lower alkyl radicals.

2. 3 - (OR') - 6 - (OR") - 4 - (R₁) - 5 - (R₂) - pyridazines, wherein $R_1$ and $R_2$ represent hydrogen atoms and R' and R" stand for lower alkoxy-alkyl radicals.

3. 3 - (OR') - 6 - (OR") - 4 - ($R_1$) - 5 - ($R_2$) - pyridazines, wherein $R_1$ and $R_2$ represent hydrogen atoms and R' and R" stand for phenyl radicals.

4. 3,6 - dimethoxy - pyridazine.
5. 3,6 - di - isopropoxy - pyridazine.
6. 3,6 - diphenoxy - pyridazine.
7. 3,6 - di - n - butoxy - pyridazine.

8. 3 - (O-R') - 6 - (O-R") - 4 - ($R_1$) - 5 - ($R_2$) - pyridazines wherein R' and R" are selected from the group consisting of lower alkyl, lower alkenyl, lower alkoxy-lower alkyl, lower alkoxy-lower alkoxy-lower alkyl, phenyl and benzyl radicals and $R_1$ and $R_2$ are selected from the group consisting of hydrogen and lower alkyl radicals.

No references cited.